April 3, 1934.  W. L. BELKNAP  1,953,582

HEAT RESPONSIVE LINK

Filed Sept. 13, 1933

Inventor:
William L. Belknap,
By [signature]
Attorney

Patented Apr. 3, 1934

1,953,582

UNITED STATES PATENT OFFICE 1,953,582

HEAT RESPONSIVE LINK

William L. Belknap, Bridgeport, Conn.

Application September 13, 1933, Serial No. 689,281

5 Claims. (Cl. 169—42)

This invention relates to improvements in heat responsive members or fusible links, and refers specifically to the provision of a stress resisting member which, when exposed to heat of a predetermined temperature, fuses and fails thereby leaving the stress unresisted.

The utility, object and advantages of my invention will be apparent from the accompanying drawing and following detail description.

In the drawing, Fig. 1 is a diagrammatic view of a fusible link used to control the operation of a valve.

Figure 1:
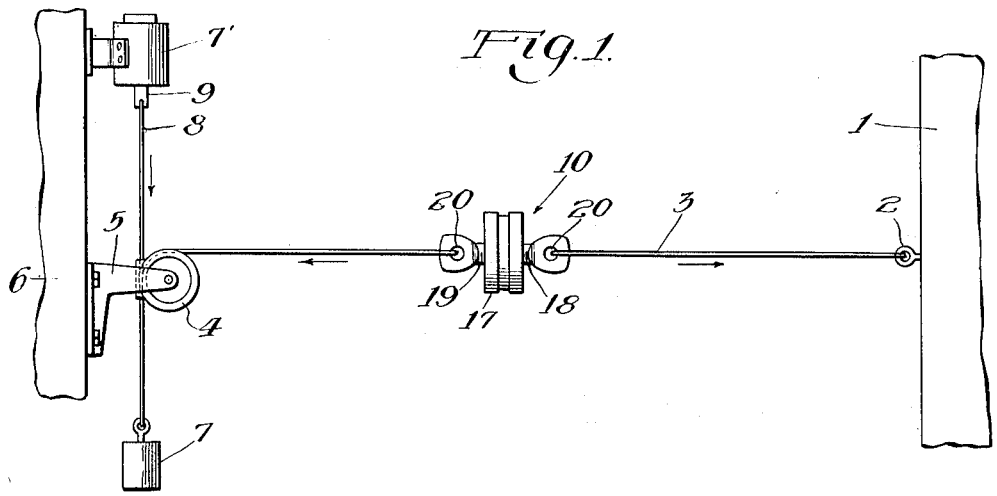
Figure 2:
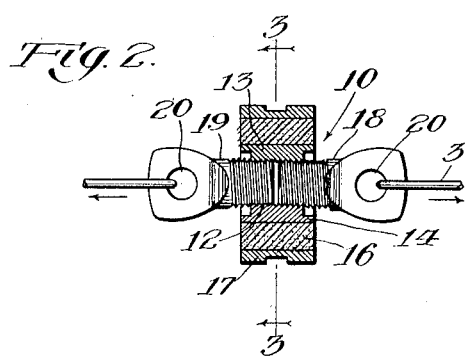
Fig. 2 is a longitudinal sectional view of the link shown in Fig. 1.
Figure 3:
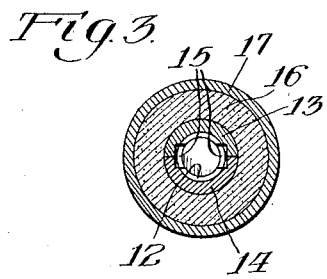
Fig. 3 is a sectional view taken on line 3—3 of Fig. 2.

Referring in detail to the drawing, 1 indicates a wall or other supporting structure secured to which is an eyelet 2. A wire 3 or other tension member such as a chain or the like, may be fastened at one end to eyelet 2. The opposite end of said tension member may pass over pulley 4 carried by bracket 5 which, in turn, may be mounted upon wall 6 or other supporting structure. A weight 7 may be carried at the end of tension member 3. Wall 6 may also support valve 7' above pulley 4 and a flexible tension member such as a wire 8 or the like may be secured to the plunger or stem 9 of the valve. The opposite end of tension member 8 may be secured to that portion of tension member 3 which passes over pulley 4. By this arrangement weight 7 is normally supported by the flexible tension member 3, member 8 merely forming a limp connection between stem 9 and the tension member 3.

Valve 7' may be normally closed in which case plunger 9 may be in its uppermost position. Valve 7', for example, may be utilized to control the introduction of water to a sprinkling system within a building, said valve acting in conjunction with other instrumentalities to cause the sprinkling system to operate in the event of fire in the building. To actuate valve 7' a fusible link 10 may be interposed intermediate the length of the flexible tension member 3, the arrangement being such that said link, when exposed to heat of a predetermined temperature, fails thereby relieving the tension within flexible member 3. In this situation flexible member 8 being connected to that portion of member 3 which passes over pulley 4 constitutes the sole support for weight 7 which is of sufficient weight to retract stem 9 thereby opening the valve.

It is to be understood, of course, that link 10 may have many other applications other than the one herein described, the same being merely set forth for purposes of illustration.

Figure 4:
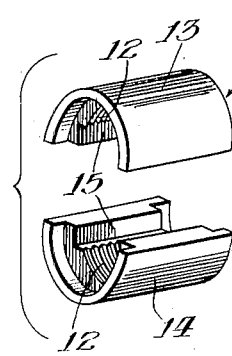
Fig. 4 is a detailed perspective view of the split threaded member of the fusible link.

Link 10 may comprise a collar 11 which may be provided with internal threads 12. Collar 11 may be formed in a plurality of portions, for instance, the same may be split into two sections 13 and 14. The internal portion of collar 11 adjacent the line of separation may be cut away as shown at 15 in Fig. 4, the purpose of which will be hereinafter more fully described. Collar 11 may be constructed of brass or other relatively hard material which has a high melting point. An annular ring or cylinder 16 may circumscribe collar 11 and may maintain sections 13 and 14 together. Ring 16 is constructed of a material having a relatively low melting point such as lead or any other readily fusible metal. To reinforce ring 16, a band 17 of brass or other metal having a relatively high melting point may circumscribe said ring. Screw threaded members 18 and 19 may threadedly engage the internal threads 12 of collar 11, said screws being threaded in opposite ends of the collar. Each of the screws 18 and 19 may terminate at its outer end in eyelet 20 to which the ends of the flexible tension member 3 may be secured. It can readily be seen that by this arrangement link 10 normally serves to maintain flexible member 3 as a continuous member.

The arrangement is such that link 10 will be interposed in flexible member 3 at a position wherein heat of an excessive nature would be likely to develop. It can readily be seen that, inasmuch as ring 16 is constructed of an easily fusible material, if link 10 were exposed to heat of a predetermined temperature, said ring would fuse thereby relieving the confining force upon the sections of collar 11. As has been hereinbefore described, member 3 is normally under tension and, consequently, screws 18 and 19 exert a radial force upon collar 11. Consequently, when the confining ring 16 melts or fuses, the radial force exerted by screws 18 and 19 causes the sections of collar 11 to separate thereby releasing their grip upon screws 18 and 19. By this action weight 7 normally suspended by tension member 3 would depend for its suspension upon member 8 and valve 7' would thereby be opened. By the provision of the cut away portions 15 along the line of separation of threads 12, sections 13 and 14 when subjected to the radial force exerted by screws 18 and 19 will not bind but will freely move away from each other.

Figure 5:
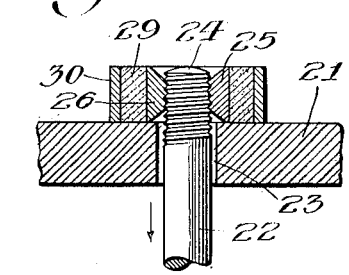
Fig. 5 is a fragmentary, sectional view of a modification of my invention having a different application.
Figure 6:
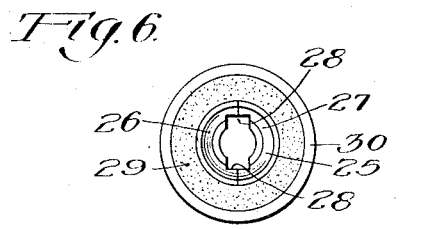
Fig. 6 is a top plan view of the fusible member shown in Fig. 5.

Referring particularly to Figs. 5 and 6, a slightly modified form of fusible member is shown, the same being adapted for another application. The reference numeral 21 indicates a fixed support and may comprise a platform, the bonnet of a valve, the body of an electric switch or other like fixed body. A stem 22 may extend through an opening 23 provided in support 21, stem 22 being freely positioned within said opening. The upper portion of stem 22 may be provided with threads 24 which may be adapted to engage with the internal threads of collar 25. Collar 25 may correspond with collar 11 and may be of split construction comprising sections 26 and 27. Similar to collar 11, the internal threads within collar 25 may be cut away as shown at 28 in Fig. 6 similar to the cut away portion 15 of collar 11. Collar 25 may be constructed of brass or other material having a relatively high melting point and the same may be circumscribed by ring 29 which may be constructed of a material similar to that constituting ring 16. A band 30 of material having a relatively high melting point such as brass or the like, may in turn circumscribe ring 29 and may reinforce said ring in holding sections 26 and 27 of collar 25 in contact with threads 24. The lower portion of stem 22 may comprise the gate or plunger of a valve, the contacting portion of an electric switch or, in general, any device which may perform a desired function when stem 22 is permitted to move.

Assuming that stem 22 is normally under tension and would tend to move downwardly were it not supported by collar 25, it can readily be seen that when ring 29 is exposed to heat of a predetermined temperature said ring will fail and, consequently, the radial force exerted by threads 24 will separate sections 26 and 27 of collar 25 and permit stem 22 to move downwardly actuating a desired mechanism and thereby performing a desired function.

Figure 7:
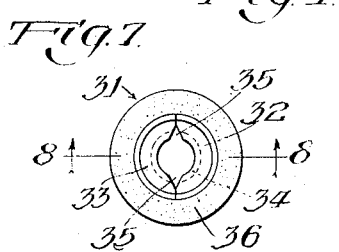
Fig. 7 is a top plan view of another modified form of my invention.
Figure 8:
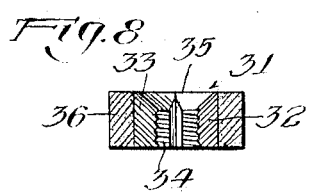
Fig. 8 is a sectional view taken on line 8—8 of Fig. 7.

Referring particularly to Figs. 7 and 8, a slightly modified form of heat responsive member is shown. This member is substantially similar in construction to those members hereinbefore described and comprises a collar 31 formed in separate portions 32 and 33. The internal portion of the collar 31 may be provided with threads 34, the threads adjacent the line of juncture between the sections 32 and 33 being cut away as shown at 35 in Figs. 7 and 8. A band 36 constructed of a readily fusible material may circumscribe collar 31, band 36 having sufficient dimensions or mass to unreinforced maintain sections 32 and 33 together.

It can readily be seen that the form of my invention shown in Figs. 7 and 8 may be substituted for the fusible member comprised in link 10 or may be utilized in the manner described in conjunction with that form shown in Figs. 5 and 6.

I claim as my invention:

1. A device of the class described comprising in combination, an internally threaded collar divided longitudinally into a plurality of sections adapted to engage a screw which is normally subjected to a force tending to move the same, and means for maintaining said sections together in collar form in engagement with said screw comprising a band of fusible material circumscribing said collar which, upon fusing, releases said sections from engagement with said screw.

2. A device of the class described comprising in combination, an internally threaded collar divided into a plurality of longitudinal sections engageable with a threaded member normally subjected to a force tending to move said member through the engagement between said collar, said member and said collar being such that a part of the force exerted upon said member acts at right angles thereto and tends to separate the sections of the collar, and a retaining element of relatively fusible metal mounted upon said collar to resist said right angle component of the force.

3. A device of the class described comprising in combination, an internally threaded collar divided longitudinally into a plurality of sections adapted to engage a screw which is normally subjected to a force tending to move the same, and means for maintaining said sections together in collar form in engagement with said screw comprising a band of fusible material circumscribing said collar, and a reinforcing band of material having a relatively high melting point circumscribing said fusible band.

4. A device of the class described comprising in combination, an internally threaded collar divided longitudinally into a plurality of sections adapted to engage a screw which is normally subjected to a force tending to move the same, and means for maintaining said sections together in collar form in engagement with said screw comprising a band of fusible material circumscribing said collar which, upon fusing, releases said sections from engagement with said screw, the threads within said collar being cut away along the longitudinal lines of juncture of said collar sections to prevent binding of said sections upon said screw when the fusible band melts.

5. A device of the class described comprising in combination, an internally threaded collar divided longitudinally into a plurality of sections adapted to engage a screw which is normally subjected to a force tending to move the same, and means for maintaining said sections together in collar form in engagement with said screw comprising a band of fusible material circumscribing said collar which, upon fusing, releases said sections from engagement with said screw, the threaded interior of said collar being provided with longitudinal slots adjacent the lines of juncture of said collar sections to prevent binding of said sections upon said screw when the fusible band melts.

WILLIAM L. BELKNAP.